United States Patent [19]

Petersen

[11] Patent Number: 4,511,171

[45] Date of Patent: Apr. 16, 1985

[54] WHEELCHAIR RESTRAINT

[76] Inventor: Lee B. Petersen, #7 Birch Ct., Danville, Calif. 94526

[21] Appl. No.: 388,521

[22] Filed: Jun. 15, 1982

[51] Int. Cl.[3] ........................... B60N 1/02; B60P 3/06

[52] U.S. Cl. .................................. 296/65 R; 188/2 F; 188/28; 188/32; 188/75; 248/500; 410/3; 410/19; 410/51

[58] Field of Search ......................... 410/3, 4, 7, 9, 19, 410/51; 296/19, 20, 65 R, 65 A; 188/2 F, 28, 32, 75; 211/5, 20; 248/500; 297/DIG. 4

[56] References Cited

U.S. PATENT DOCUMENTS

| | | | |
|---|---|---|---|
| 2,623,759 | 12/1952 | Forbas | 188/32 X |
| 3,897,101 | 7/1975 | Hess | 296/65 A |
| 4,019,752 | 4/1977 | Leon et al. | 410/4 X |
| 4,027,747 | 6/1977 | Moorman, Jr. | 188/28 |
| 4,093,303 | 6/1978 | Nelson | 296/65 R |
| 4,103,934 | 8/1978 | Arnholt et al. | 280/751 X |
| 4,113,270 | 9/1978 | Barecki | 188/2 F X |
| 4,122,629 | 10/1978 | Rennick | 188/32 X |
| 4,257,644 | 3/1981 | Stephens | 296/65 R |
| 4,265,478 | 5/1981 | Korsgaard | 296/65 R |
| 4,266,822 | 5/1981 | Barecki et al. | 296/65 R |
| 4,369,995 | 1/1983 | Harder, Jr. | 410/51 X |
| 4,389,056 | 6/1983 | Tenniswood | 296/65 R |

*Primary Examiner*—Randolph Reese

*Attorney, Agent, or Firm*—Robert R. Tipton

[57] ABSTRACT

An apparatus for restraining a wheelchair in a transit vehicle utilizes a fixed bumper that is adapted to engage the rear portion of a wheelchair wheel in which a movable restraining bumber is adapted to hold the wheelchair wheel in compression between the fixed and movable restraining bumpers. The movable restraining bumper is adapted to move toward and away from the wheelchair and to rotate out of the way when the wheelchair restraint is not in use. A passenger barrier is also adapted to move toward and away from the wheelchair and rotate out of the way when the wheelchair restraint is not in use.

2 Claims, 17 Drawing Figures

WHEELCHAIR RESTRAINT

BACKGROUND OF THE PRIOR ART

This invention relates generally to wheelchair restraining devices and particular to a wheelchair restraining device that clamps the wheelchair in a fixed position.

The wheelchair restraining devices of the prior art included such devices as cables and straps anchored to the transit vehicle floor and adapted to be connected to the wheelchair axle and framework to prevent the wheelchair from moving.

Other devices consisted of a safety belt anchored to the transit vehicle body and adapted to pass around both the wheelchair and the person occupying the wheelchair.

Still other devices consisted of special clamping devices that were adapted to engage the wheelchair tire and rim at the rear of the wheel. The wheelchair passenger had to reach behind the wheelchair to release the clamp.

Another device utilized a fence or corral-like structure in which a lower and upper framework were rotated to come together and clamp both wheels of the wheelchair in compression proximate the top and bottom of the wheels.

Other devices included a vertical post having clamping mechanisms clamped onto some rigid portion of the wheelchair and also included a passenger operated trigger type release mechanism permitting release of the clamping system by the wheelchair passenger.

All of these prior art devices where either excessively complex and difficult or impossible for a disabled person to operate or they occupied an excessively large floor space to make them generally impractical to install on a transit vehicle.

SUMMARY OF THE INVENTION

The wheelchair restraining apparatus of the present invention comprises, basically, a fixed bumper adapted to engage the rear portion of a wheelchair wheel, a movable restraining bumper adapted to engage the front end of a wheelchair wheel and also adapted to hold the wheelchair wheel in compression between the fixed bumper and the movable restraining bumper, and a linear actuator means for moving the movable restraining bumper toward and away from the fixed bumper, which means also causes the movable restraining bumper and a passenger barrier to rotate out of the way when the wheelchair restraint apparatus is not in use. The wheelchair restraining apparatus of the present invention also includes a ratchet and pawl arrangement to hold the movable restraining bumper in the open position or to hold the movable restraining bumper against the wheelchair wheel when the wheelchair restraining apparatus is in use.

It is, therefore, an object of the present invention to provide an apparatus for restraining the movement of a wheelchair on a transit vehicle.

It is a further object of the present invention to provide an apparatus for restraining a wheelchair on a transit vehicle in which the wheelchair wheel is clamped between a fixed and movable restraining bumper.

It still a further object of the present invention to provide an apparatus for restraining wheelchair movement on a transit vehicle in which a movable barrier and movable restraining bumper are first rotated to a position in front of the wheelchair and then moved toward the wheelchair to clamp one of the wheels of the wheelchair between the movable restraining bumper and the fixed bumper.

It is yet another object of the present invention to provide an apparatus for restraining wheelchair movement on a transit vehicle which is actuated by movement of the wheelchair into a position against a fixed bumper.

It is still another object of the present invention to provide an apparatus for restraining a wheelchair on a transit vehicle in which the speed of actuation and movement of a movable restraining bumper is controlled by a pneumatic/hydraulic system.

It a further object of the present invention to provide a wheelchair restraining apparatus for use on a transit vehicle in which the wheelchair operator can override the clamping action of the apparatus to release the wheelchair.

These and other objects of the present invention will become manifest upon study of the following detailed description when taken together with the drawings.

DESCRIPTION OF THE PREFERRED EMBODIMENT

Figure 1:
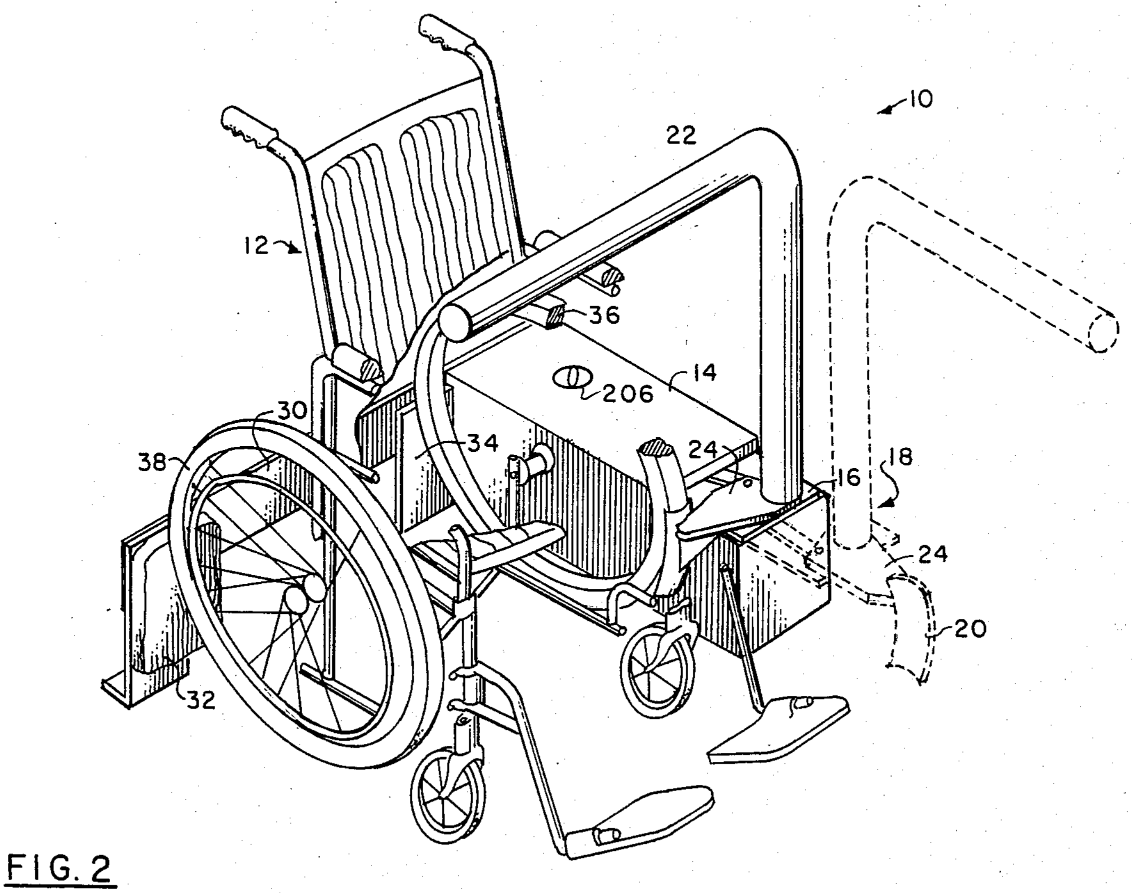
FIG. 1 is an isometric view of the wheelchair restraining apparatus of the present invention showing its use with a wheelchair.
Figure 2:
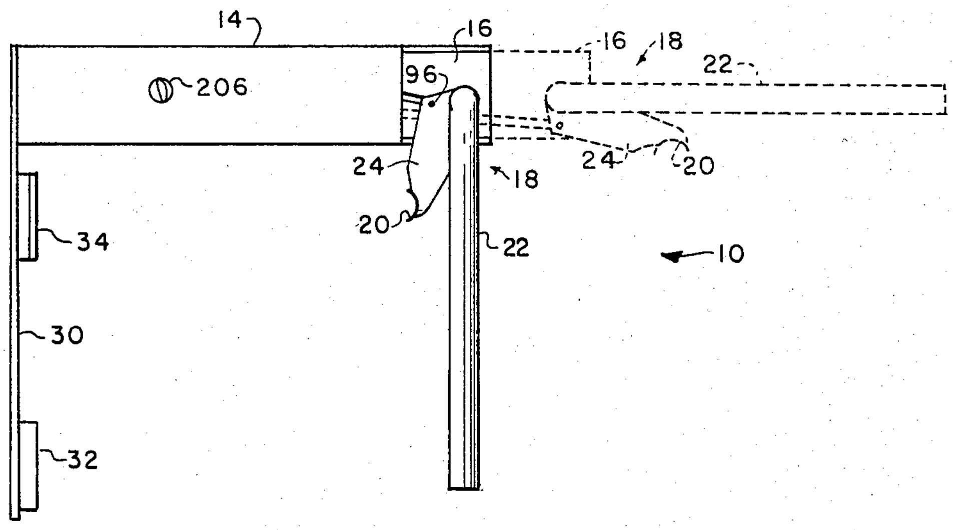
FIG. 2 is a plan view of the basic wheelchair restraining apparatus of the present invention.

With reference to FIGS. 1 and 2 there is illustrated an isometric view of the wheelchair restraining apparatus 10 of the present invention showing its use with a wheelchair 12. The wheelchair restraining apparatus 10 comprises, basically, an actuator housing 14 having mounted therein an actuator base support 40 on which is mounted a bumper barrier movable support 16. Bumper barrier movable support 16 is adapted to move toward and away from wheelchair 12.

Mounted on bumper barrier movable support 16 is a movable restraining bumper assembly 18 comprising a movable bumper 20, a passenger barrier 22 and a movable bumper bracket 24 connecting movable bumper 20 to passenger barrier 22, the assembly being pivotally connected through pivot 66 to bumper barrier movable support 16.

With reference to to FIG. 2, the wheelchair restraining apparatus 10 of the present invention further comprises a fixed bumper 30 on which is mounted a fixed bumper wheel pad 32 and a fixed bumper actuating switch or valve 34. It will be noted that one wheel 38 of wheelchair 12 is adapted to engage fixed bumper wheel pad 32, while the other wheel 36 of wheelchair 12 is adapted to engage fixed bumper wheel actuating switch or valve 34 proximate tne rear portion of wheelchair 12 while movable bumper 20 is adapted to engage the front portion of wheel 36 of wheelchair 12.

With reference to FIG. 3A, 3B, 3C and 3D, there is illustrated a mechanical schematic drawing of the apparatus for actuating movable restraining bumper assembly 18 located on bumper barrier movable support 16 inside housing 14. The apparatus comprises, basically, an actuator base support 40 on which is slidably mounted bumper barrier movable support 16.

Also mounted on the end of bumper barrier movable support 16 distal movable restraining bumper assembly 18, is pawl and ratchet assembly 42 which is used to maintain movable restraining bumper assembly 18 either in the open or the closed position without maintaining pressure in the hydraulic/pneumatic system 200 described below. Pawl and ratchet assembly 42 comprises, basically, a fixed ratchet 44 attached to actuator base support 40 and rocker arm pawl 46 which is pivotally connected to bumper barrier movable support 16 by pivot or shaft 48. A pawl spring 50 is used to maintain rocker arm pawl 46 in one of two positions to allow bumper barrier movable support 16 to move either in toward wheelchair 12 or out away from wheelchair 12.

To move bumper barrier movable support 16 toward and away from wheelchair 12, a linear motion actuator assembly 56 is used. Linear motion actuator assembly 56 comprises, basically, an hydraulic/pneumatic fixed member or cylinder 58 in conjunction with a piston actuating arm 60 which is connected to linear actuator movable bumper pivot arm 62 by pivot pin 90. Linear actuator movable bumper pivot arm 62 is, in turn, connected to movable bumper connecting rod 64 by pivot pin 68. Movable bumper connecting rod 64 is, in turn, pivotally connected to movable bumper bracket 24 by pivot pin 96 disposed radially outward from pivot pin 66 where movable restraining bumper assembly 18 is pivotally connected to bumper barrier movable support 16.

Figure 3A:
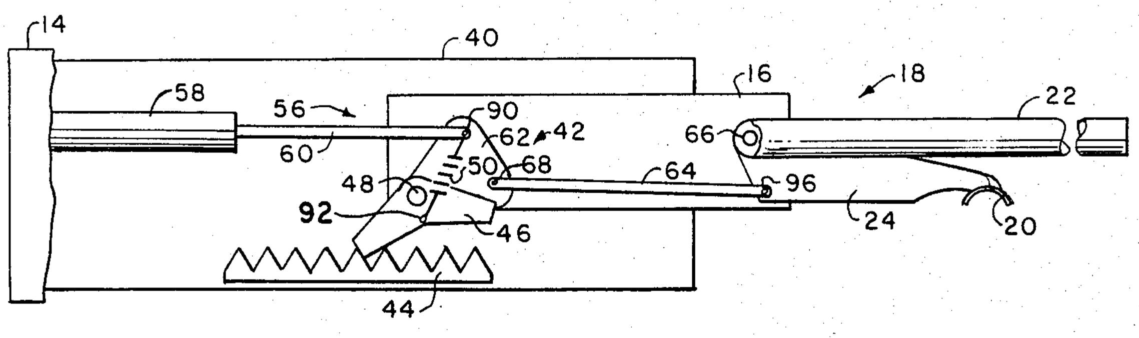
FIG. 3A is a schematic diagram of the linear actuating mechanism of the wheelchair restraining device of the present invention showing the movable restraining bumper and passenger barrier at its furthest extended position when the wheelchair restraining apparatus is not in use and ready to receive a wheelchair.
Figure 3B:
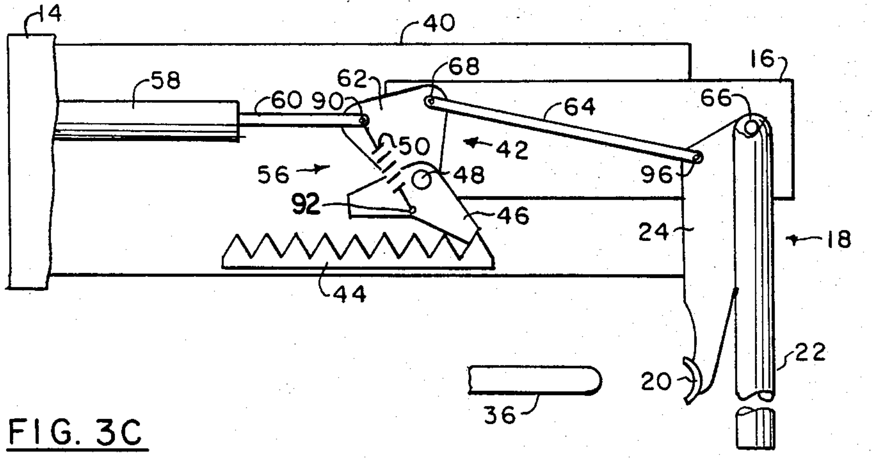
FIG. 3B is a schematic diagram of the linear actuating mechanism of the wheelchair restraining device of the present invention showing the position of the mechanical parts as the movable restraining bumper and passenger barrier are retracted toward the fixed bumper and wheelchair wheel.

Please note that for the embodiment illustrated in FIGS. 3A tnrough 3D, inclusive, pivot pin 66 and pivot pin 96 are located such that movable bumper connecting rod 64 is in tension when movable restraining bumper assembly 18 is rotated from the open position in FIG. 3A to the closed position in FIG. 3B. Movable bumper connector rod 64 is further maintained in tension while restraining the wheelchair in the position shown in FIG. 3C.

Linear actuator movable bumper pivot arm 62 is also adapted to be journalled to shaft 48.

Figure 8A:
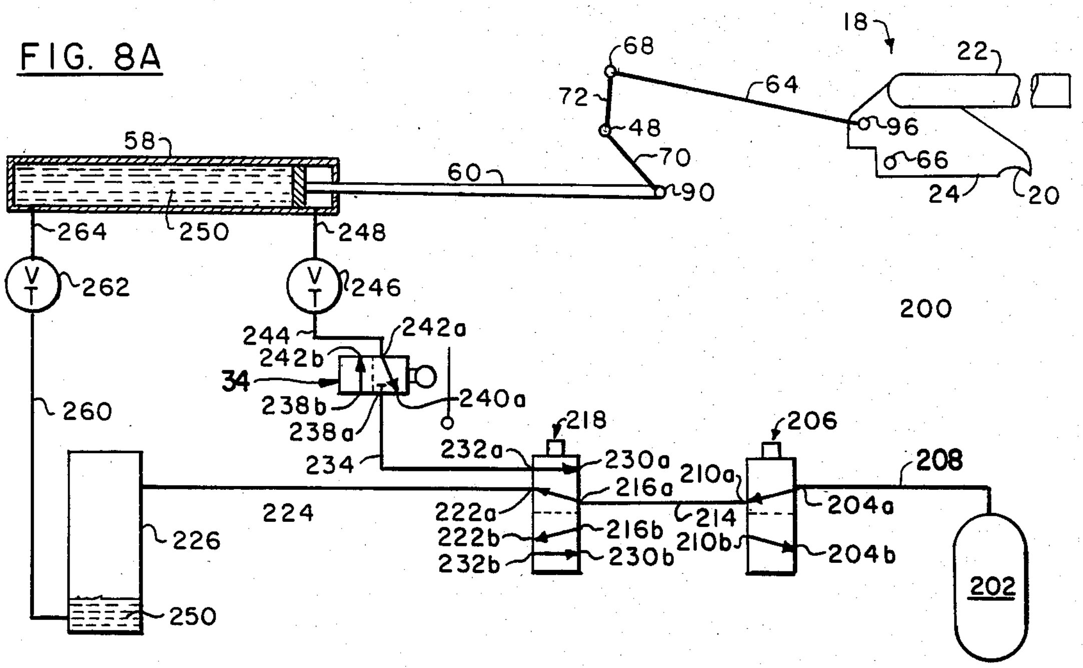
FIG. 8A is a schematic diagram of the pneumatic/hydraulic system showing the position of the actuating piston and various operating valves when the apparatus of FIGS. 6A–6D is in the open position.
Figure 8B:
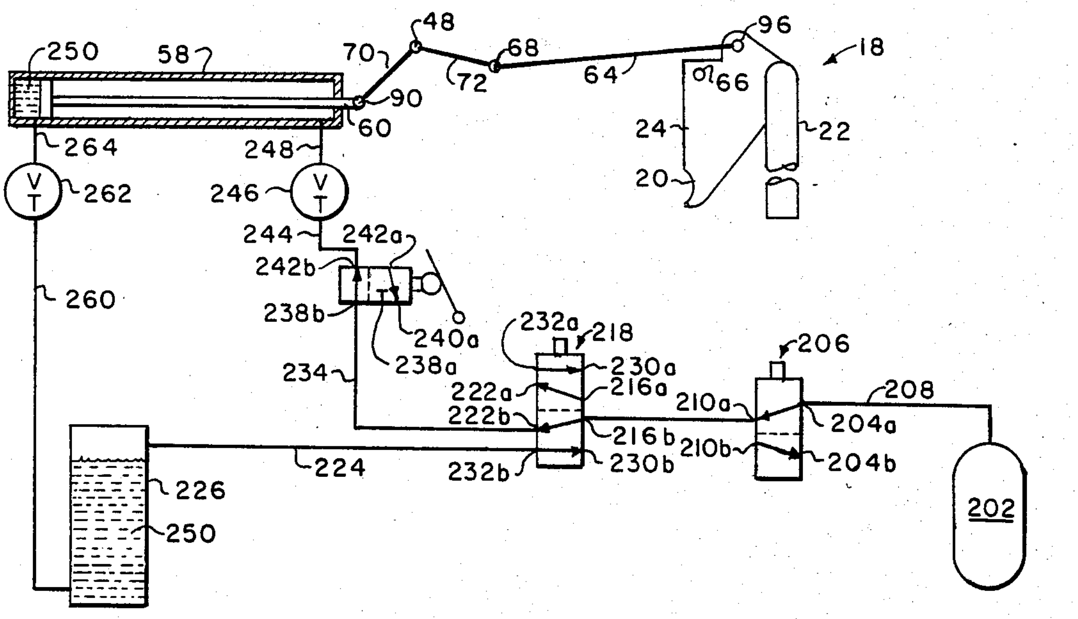
FIG. 8B is a schematic diagram of the pneumatic/hydraulic system showing the position of the actuating piston and various operating valves when the apparatus of FIGS. 6A–6D is in the closed or wheelchair restraining position.

Actuation of hydraulic/pneumatic cylinder 58 and piston actuating arm 60 is achieved using the hydraulic/pneumatic control system 200 illustrated in FIG. 8A and 8B. Although the mechanical configuration connected to the end of actuating arm 60 in FIGS. 8A and 8B is an illustrated of the apparatus of FIGS. 5 and 6A–6D, that mechanical configuration can just as easily be replaced by the apparatus illustrated in FIGS. 3A–3D.

With reference to FIG. 8A, there is illustrated a schematic diagram of the hydraulic/pneumatic control system 200 of the present invention showing the valve positions when the wheelchair restraining apparatus is in the open position ready to receive a wheelchair passenger. The apparatus of FIG. 8A comprises, basically, a compressed air supply 202, such as, for example, that typically found in a transit vehicle, which is shown providing compressed air to input port 204*a* of system pressure emergency dump valve 206 through conduit 208.

Outlet port 210*a* of system pressure emergency dump valve 206 is pneumatically connected, through conduit 214, to pressure input port 216*a* of transit vehicle driver control valve 218.

Outlet port 222*a* of transit vehicle driver control valve 218 is pneumatically connected, through conduit 224, to the top end of hydraulic fluid reservoir 226.

Port 230*a* of transit vehicle driver control valve 218 is shown vented to atmosphere.

Port 232*a* of transit vehicle driver control valve 218 is pneumatically connected, through conduit 234, to blocked port 238*a* of fixed bumper actuating switch or valve 34. Port 240*a* of fixed bumper actuating switch or valve 34 is shown vented to atmosphere. Port 242*a* of fixed bumper actuating switch or valve 34 is pneumatically connected, through conduit 244, to throttling valve 246, which, in turn, is pneumatically connected through conduit 248 to the top end of hydraulic/pneumatic cylinder 58.

The bottom end of hydraulic fluid reservoir 226 is hydraulically connected, through conduit 260 to throttling valve 262, which, in turn, is hydraulically connected through conduit 264 to the bottom end of hydraulic/pneumatic cylinder 58.

FIG. 8B utilizes the same mechanical elements as FIG. 8A, however, the valve positions have been changed to illustrate their positions when the wheelchair restraining apparatus is in the closed or "wheelchair engaging" position.

To operate the first embodiment of the wheelchair restraining apparatus 10 of the present invention, reference is made to FIG. 3A. In FIG. 3A, the linear actuating mechanism of the wheelchair restraining device 10 of the present invention is shown with movable restraining bumper 20 and passenger barrier 22 at its furthest extended position when the wheelchair restraining apparatus 10 is not in use and ready to receive a wheelchair.

In this position, linear motion or piston actuating arm 60 of hydraulic/pneumatic cylinder or fixed member 58 is shown extended to its furthest position as is bumper barrier movable support 16 also shown extended to its furthest position away from fixed bumper 30 and wheelchair 12. Also in this position it will be noted that movable restraining bumper assembly 18 and passenger barrier 22 are rotated out of the way of the area to be occupied by wheelchair 12.

As a wheelchair 12 enters the space to occupied by the wheelchair, wheels 36 and 38 (FIG. 1) are caused to engage fixed bumper actuating switch 34 and wheel pad 32, respectively, of fixed bumper 30 (FIG. 2) with wheel 36 of wheelchair 12 actuating fixed bumper actuating switch or valve 34.

The hydraulic/pneumatic pressure system 200 (FIGS. 8A and 8B) is thus energized by the actuation of fixed bumper actuating switch or valve 34, as described below in greater detail when applied to FIGS. 6A through 6D, inclusive. Energizing the hydraulic/pneumatic pressure system 200 will cause linear motion actuator arm 60 of hydraulic/pneumatic cylinder 58 to retract to the left thus causing linear actuator movable bumper pivot arm 62 to rotate in a counter-clockwise direction. This motion causes movable bumper connecting rod 64 to also move to the left at the same time pulling on movable restraining bumper assembly 18 to cause it to rotate about pivot 66 to a position in front of wheelchair 12. Thus both passenger barrier 22 and movable bumper 20 are rotated into a position in front of wheelchair 12, however, movable bumper 20 has not yet moved to engage wheel 36 of wheelchair 12.

It will also be noted that whereas, in FIG. 3A, rocker arm pawl 46 is rotated to a position such that the left end or arm of pawl 46 engages fixed ratchet 44. In FIG. 3B, rocker arm pawl 46 is now rotated such that the right end or arm of rocker arm pawl 46 now engages fixed ratchet 44. This, it will be noted, is caused by the effect of pawl spring 50 which has one end connected to pivot pin 90 of linear motion actuator arm 60. Pivot pin 90 also pivotally connects linear motion actuator arm 60 to linear actuator movable bumper pivot arm 62. The other end of pawl spring 50 is connected to pawl spring pin 92 of rocker arm pawl 46 at a point below or on the opposite side of pivot or shaft 48. As the motion of the end of linear motion actuator arm 60 causes the longitudinal axis of spring 50 to move past the extended axis of rotation of shaft 48, the force of spring 50 will cause rocker arm pawl 46 to rock about shaft 48 resulting in its coming to rest in the position shown in FIG. 3B.

Figure 3C:
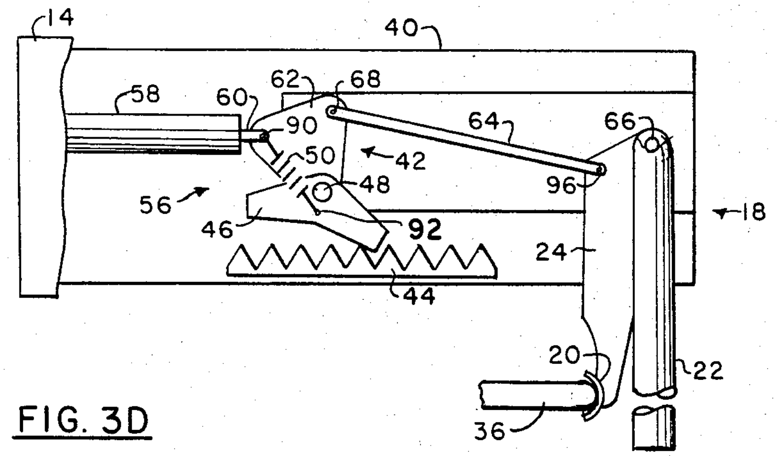
FIG. 3C is a schematic diagram of the linear actuating mechanism of the wheelchair restraining device of the present invention showing the position of the mechanical parts of the apparatus when the movable restraining bumper and passenger barrier are at their closed position to the fixed barrier and wheelchair wheel.

With reference to FIG. 3C, as piston or linear motion actuating arm 60 further moves or is retracted into hydraulic/pneumatic fixed cylinder or member 58, it retracts or moves bumper barrier movable support 16 to the left toward wheelchair 12, thus moving movable bumper 20 toward wheel 36 of wheelchair 12 until movable bumper 20 engages wheel 36 and holds wheel 36 in compression between fixed bumper 30 and movable bumper 20.

The hydraulic/pneumatic pressure system 200 (FIGS. 8A and 8B) is adapted, by means common in the art using a pressure regulator (not shown), to turn itself off when pressure between fixed bumper 30 and movable bumper 20 reaches a predetermined maximum value.

When this predetermined maximum pressure value is reached and if pressure is released from hydraulic/pneumatic cylinder 58, it can be seen from FIG. 3C that rocker pawl 46 will hold movable bumper 20 against wheel 36 since it now engages fixed ratchet 44.

Figure 3D:
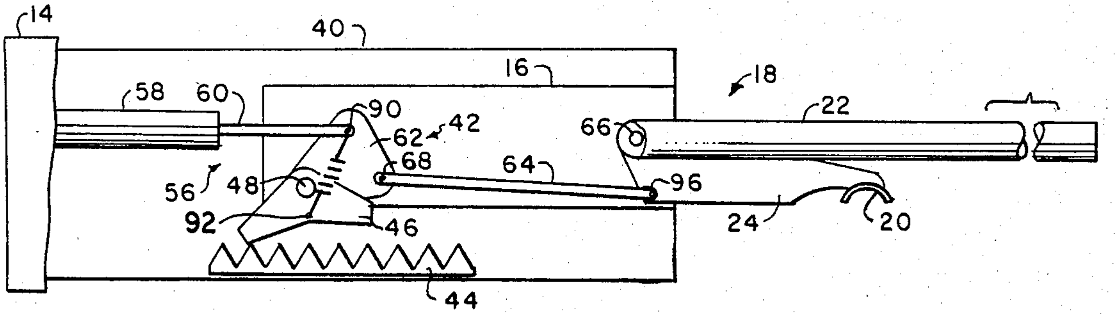
FIG. 3D is a schematic diagram of the linear actuating mechanism of the wheelchair restraining device of the present invention showing the position of the mechanical parts just after the actuating mechanism begins its movement away from the fixed barrier end of the apparatus.

With reference to FIG. 3D, upon actuation of transit vehicle driver control valve 218 to the "a" position (see FIGS. 8A and 8B) the hydraulic/pneumatic pressure system 200 (as described below for FIGS. 8A and 8B) causes piston actuating arm or movable member 60 to now move to the right away from hydraulic of pneumatic cylinder 58. This motion causes linear actuator movable bumper pivot arm 62 to rotate in a clockwise direction to a position as shown in FIG. 3D whereby movable bumper connector rod 64 is also caused to move to the right. Since movable bumper connector rod 64 is pivotally connected to movable bumper bracket 24 through pivot pin 96, the motion causes movable restraining bumper assembly 18 to rotate about pivot 66 to a position away from wheelchair 12 simultaneously causing movable bumper 20 to rotate away from wheel 36 of wheelchair 12 thus releasing wheelchair 12.

It can also be seen that the rotation of linear actuator movable bumper pivot arm 62 to the position shown will also cause pawl spring 50 to bias rocker arm pawl 46 to rotate into a position as shown in FIG. 3D. This will release rocker arm pawl 46 from fixed ratchet 44 and now allow bumper barrier movable support 16 to move to the right away from wheelchair 12 as piston actuating arm or movable member 62 continues its travel to the right and returns the apparatus to the position as shown in FIG. 3A.

There may be some instances in which the friction between the end of rocker arm pawl 46 and fixed ratchet 44 will be sufficient to prevent spring 50 from releasing pawl 46 from ratchet 44 when movable restraining bumper assembly 18 is engaging wheel 36 of wheelchair 12.

Figure 4A:
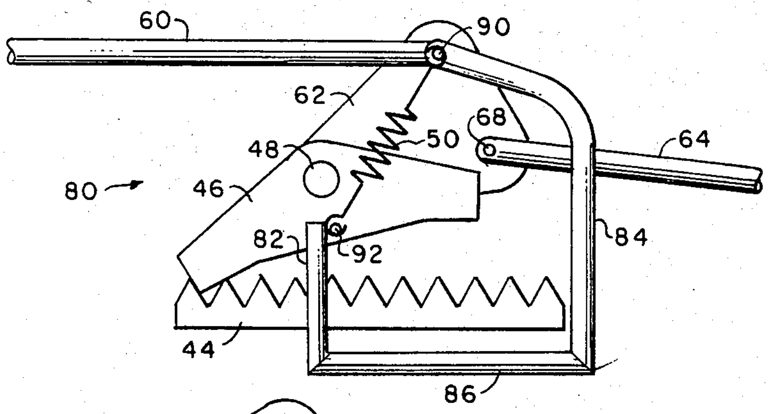
FIG. 4A is a schematic diagram of the mechanism for releasing the pawl from the ratchet as the movable restraining bumper moves away from the fixed bumper.
Figure 4B:
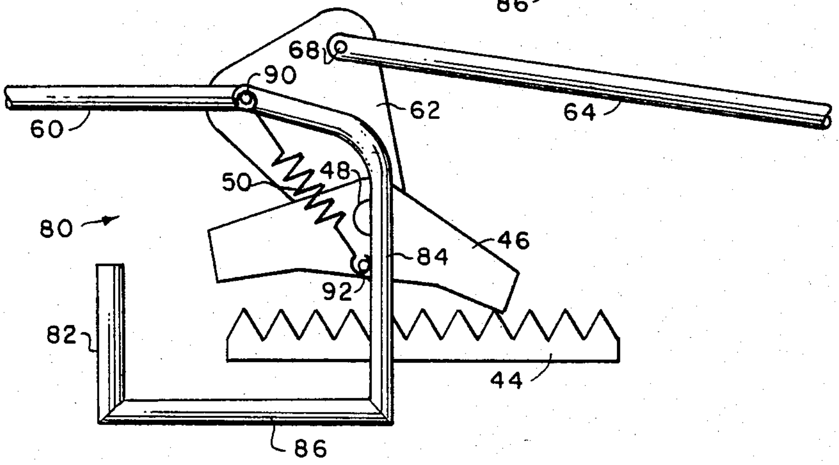
FIG. 4B is a schematic diagram of the mechanism for releasing the movable pawl from its fixed ratchet as the movable restraining bumper moves toward the fixed bumper.

To provide a positive release of rocker arm pawl 46 in the event the end of rocker arm 46 cannot be released from fixed ratchet 44 by the force of spring 50, the positive release mechanism 80 shown in FIGS. 4A and 4B can be used.

With reference to FIG. 4A, positive release mechanism 80 comprises, basically, a rocker arm pawl first release member 82 and a rocker arm pawl second release member 84 interconnected by a rocker arm pawl release member connector bracket 86. Rocker arm pawl release assembly or mechanism 80 is pivotally connected by pivot pin 90 to the end of piston actuating arm or movable member 60 and linear actuator movable bumper pivot arm 62. Thus rocker arm pawl release assembly mechanism 80 will move back and forth, that is to the right or left, as piston actuating arm or movable member 60 moves to the right or left.

It will be noted in FIGS. 4A and 4B that one end of pawl spring 50 is attached to pivot pin 90 which is the common pivotal connection of piston actuating arm or movable member 60 to rocker arm pawl release assembly 80 and to linear actuator movable bumper pivot arm 62.

The other end of spring 50 is attached to rocker arm pawl spring pin 92. Pawl spring pin 92 is adapted to extend away from rocker arm pawl 46 to engage either rocker arm pawl first release member 82 or rocker arm pawl second release member 84 as they complete their leftward or rightward motion depending upon the movement of piston actuating arm or movable member 60.

As shown in FIG. 4A, when release of rocker arm pawl 46 from fixed ratchet 44 is needed to allow piston actuating arm or movable member 60 to move to the right, movement by movable member or piston actuating arm 60 will cause rocker arm pawl first release member 82 to engage the left side of pin 92 and force rocker arm pawl 46 to rotate in a counter-clockwise direction. This rotation will raise the right end of rocker arm pawl 46 away from fixed ratchet 44 and cause the left arm of rocker arm pawl 46 to come down to engage fixed ratchet 44. As rocker arm pawl 46 moves to the right, which would be away from fixed bumper 30 (FIG. 2), the left arm of rocker arm pawl 46 will merely bounce over the teeth of fixed ratchet 44. Spring 50 will now hold rocker arm pawl 46 in the position shown in FIG. 4A.

In order to reverse direction and permit rocker arm pawl release assembly 80 and piston actuating arm or movable member 60 to move to the left toward fixed bumper 30, as shown in FIG. 4B, rocker arm pawl second release member 84 is caused to move toward pin 92 by the leftward motion of piston actuating arm or movable member 60. When the leftward motion of rocker arm pawl second release member 84 is sufficient to engage pin 92, it will now cause rocker arm pawl 46 to rotate in a clockwise direction. This clockwise motion will raise the left arm of rocker arm pawl 46 away from fixed ratchet 44 and cause the right arm of rocker arm pawl 46 to descend and engage fixed ratchet 44. Spring 50, in this position, will now maintain rocker arm pawl 46 in the position shown in FIG. 4B.

As rocker arm pawl release assembly 80 and piston actuating arm or movable member 60 move to the left or toward fixed bumper 30 and wheel 36 of wheelchair 12 (FIG. 1), the right arm of rocker arm pawl 46 will now bounce over the teeth of fixed ratchet 44 preparatory to engaging fixed ratchet 44 when piston actuating arm or movable member 60 reaches its limit of travel as determined by the diameter of wheel 36 of wheelchair 12.

Figure 5:
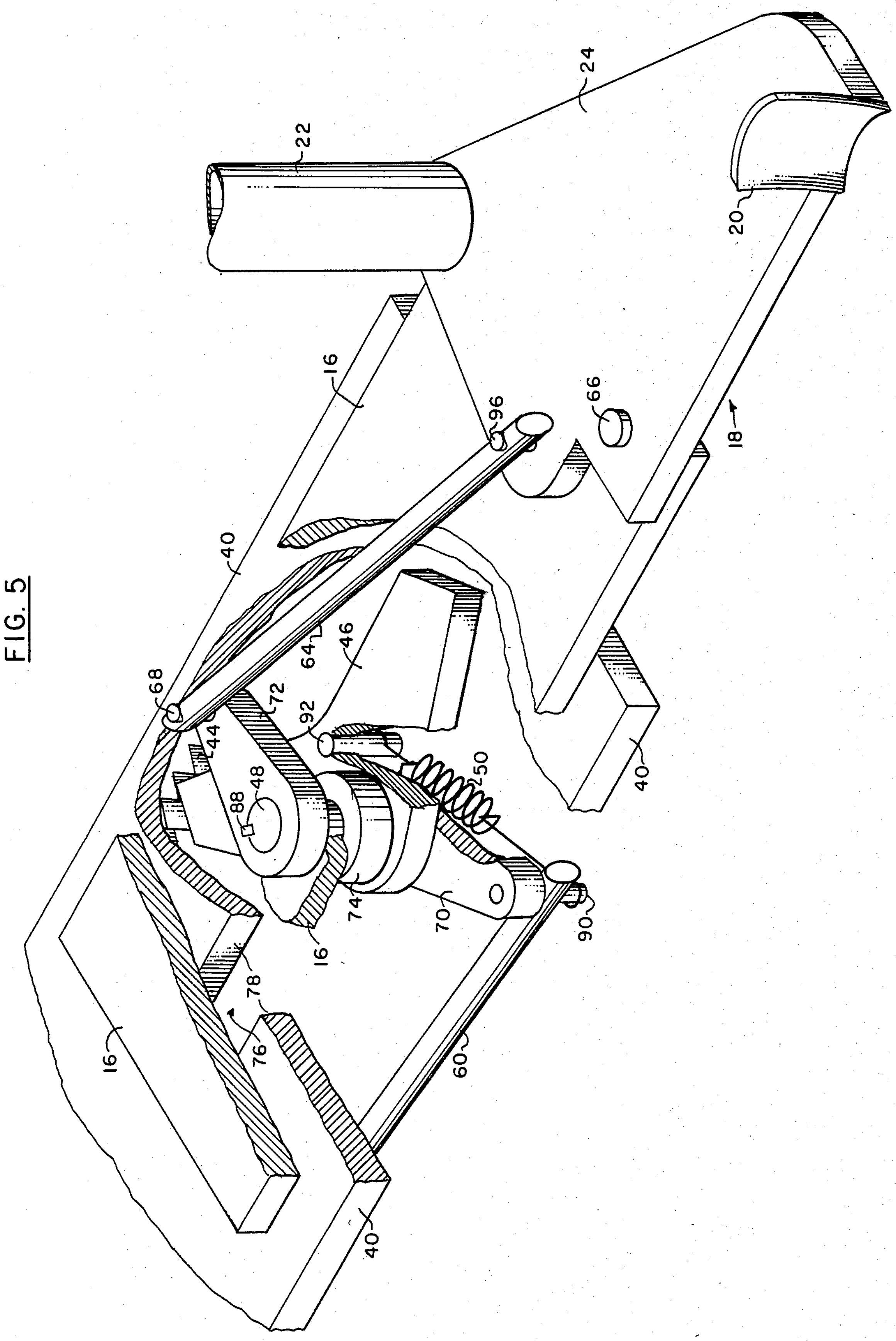
FIG. 5 is a isometric, partial cut-away view of a further embodiment of a portion of the linear actuator mechanism of the present invention.

With reference to FIG. 5, there is illustrated an isometric partial cut-away view of a portion of the wheelchair restraining apparatus of the present invention illustrating a further embodiment of the linear actuating mechanism of the wheelchair restraining apparatus of the present invention.

The elements shown in FIG. 5 are identical to those shown in FIGS. 3A through 3D as well as FIGS. 4A and 4B with the exception that linear actuator movable bumper pivot arm 62 has been replaced by linear actuator pivot arm 70 and a movable bumper pivot arm 72. Both linear actuator pivot arm 70 and movable bumper pivot arm 72 are connected to shaft or pivot 48 and retained in relative angular relation to each other and in a fixed relationship to shaft 48 through the use of spline 88. Thus any rotational movement of linear actuator pivot arm 70 will cause a corresponding rotational movement of movable bumper pivot arm 72.

Further, it will be noted in FIG. 5 that the angular separation of pivot pins 68 and 90 is much greater than the angular separation shown in FIGS. 3A–3D and that they are also on opposite sides of shaft 48.

It will also be noted that the relationship of pivot pins 66 and 96 are reversed such that when piston actuating arm or movable member 60 is retracted toward hydraulic/pneumatic cylinder 58, movable bumper connecting rod 64 is placed in compression to push movable bumper bracket 24 in a clockwise direction and simultaneously cause movable bumper 20 and passenger barrier 22 to rotate to a position in front of wheelchair 12. As previously described for FIGS. 3A–3D, movable bumper connecting rod 64 performs this function while under tension.

The purpose of including FIGS. 5, 6A–6D, 7A and 7B, is to illustrate a further safety feature that can be incorporated into the apparatus.

For example, going back to FIG. 3C, it can be seen that if sufficient pressure were applied to passenger barrier 22, the pneumatic pressure in hydraulic/-pneumatic cylinder 58 could be overcome and cause movable bumper pivot arm 62 to rotate and release pawl 46 from fixed ratchet 44 allowing the wheelchair and its passenger to be released. Such a force might be occur in the event of either a panic stop of the transit vehicle or a collision involving the transit vehicle.

To prevent this possible release from occurring, the configuration illustrated in FIGS. 5, and 6A–6D has been invented.

It will also be noted that rocker arm pawl 46 is also journalled to shaft 48, however, it is free to rotate relative to shaft 48 and is not restricted by spline 88.

As a further means for guiding bumper barrier movable support 16 in a linear motion toward and away from fixed bumper 30 (FIG. 2), a bumper barrier movable support guide slot 76 is provided in actuator base or fixed support 40. A bumper barrier movable support guide bearing 74, which is also journalled to shaft 48 and is permitted to freely rotate about shaft 48, is adapted to fit into and engage side walls 78 of slot 76 to guide bumper barrier movable support 16 as it moves toward and away from fixed bumper 30 (FIGS. 1 and 2).

It will be noted that bumper barrier movable support 16 is also journalled to shaft 48 whereby shaft 48 is free to rotate in the bearing formed by the hole in bumper barrier movable support 16.

Thus it can be seen that linear actuator pivot arm 70 and rocker arm pawl 46 are disposed below actuator base or fixed support 40 while movable bumper pivot arm 72 is disposed above bumper barrier movable support 16. Bumper barrier movable support 16, as previously described, is slidably mounted on top of actuator base or fixed support 40.

It will also be observed that fixed ratchet 44 is attached to the underside of actuator base or fixed support 40.

In the position shown in FIG. 5, bumper barrier movable support 16 is shown in a fully extended position away from fixed support 30 (FIG. 2) ready to receive a wheelchair. Thus piston actuating arm or movable member 60 is in its furthest extended position. In this position, movable bumper pivot arm 72 is rotated to a position causing movable bumper bracket 24 and movable bumper 20, along with passenger barrier 22, to be rotated out of the way. Rocker arm pawl 46 has been rotated about shaft 48 by the force of pawl spring 50 so that one leg of pawl 46 engages ratchet 44 to prevent leftward movement of support 16. Pawl spring 50 has one end attached to pivot pin 90 with its other end attached to rocker arm pawl spring pin 92. In this position, rocker arm pawl 46 engages fixed ratchet 44 in a manner to prevent bumper barrier movable support 16 from being moved or retracted toward fixed bumper 30 (FIG. 2).

Upon retraction of piston actuating arm or movable member 60, linear actuator pivot arm 70 will be rotated in a clockwise (leftward) direction. This will also cause movable bumper pivot arm 72 to rotate in a direction to the right (clockwise rotation) and create compression in movable bumper connector rod 64. This compression will cause movable bumper bracket 24 and movable bumper 20 to be pushed or rotated in a clockwise motion about pivot 66 (FIG. 5) to a position in front of wheelchair 12 which occupies the space between fixed bumper 30 (FIG. 2) and movable bumper 20.

As the centerline of spring 50 passes through the extended axis of rotation of shaft 48, the spring 50 bias forces will be applied to pin 92 and cause rocker arm pawl 46 to rotate in a counter-clockwise direction and release one end of rocker arm pawl 46 from fixed ratchet 44. This will allow bumper barrier movable support 16 to slidably move toward fixed bumper 30 (FIG. 2) being guided in that direction by slot 76 and bumper barrier movable support guide bearing 74.

Pivot arm connector rod pivot pin 68 and connector rod movable bumper bracket pivot pin 96 allow movable bumper connector rod 64 to pivot freely relative to movable bumper pivot arm 72 and movable bumper bracket 24, respectively.

To further illustrate these functions, reference is made to FIGS. 6A through 6D, inclusive.

Figure 6A:
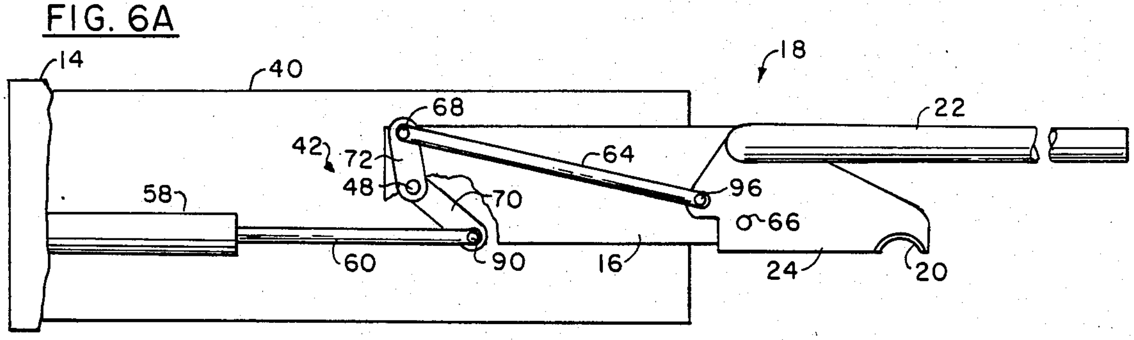
FIG. 6A is a schematic diagram of the linear actuating mechanism of the wheelchair restraining device of FIG. 5 showing the movable restraining bumper and passenger barrier at its furthest extended position when the wheelchair restraining apparatus is not in use and ready to receive a wheelchair.

FIG. 6A is a schematic diagram of the linear actuator mechanism of the wheelchair restraining device 10 shown in FIG. 5. In FIG. 6A the movable restraining bumper assembly 18 and passenger barrier 22 are shown at their furthest extended position when the wheelchair restraining apparatus is not in use and is ready to receive a wheelchair.

In this position, piston actuating arm 60 is at its greatest extended position in which linear actuator pivot arm 70 and movable bumper pivot arm 72 are rotated to cause movable bumper connecting rod 64 to pull movable bumper bracket 24 and passenger barrier 22 out of the way.

Figure 6B:
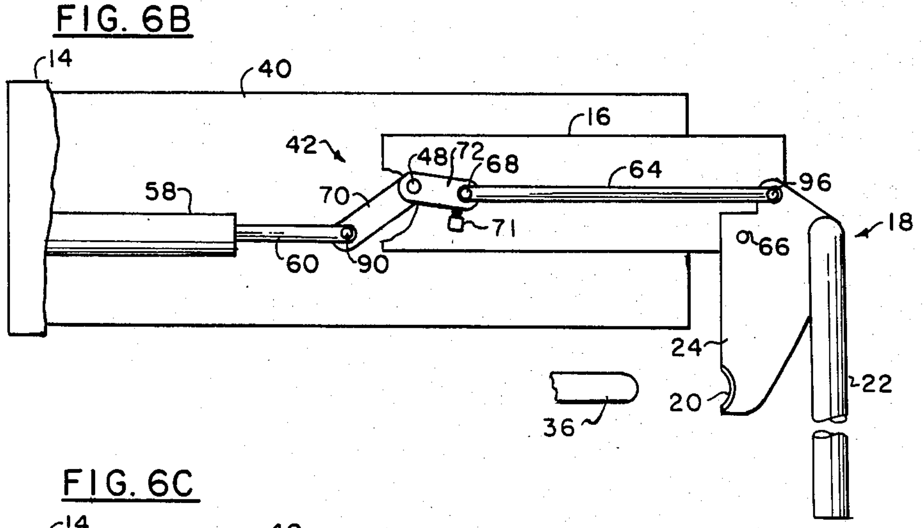
FIG. 6B is a schematic diagram of the linear actuating mechanism of the wheelchair restraining device of FIG. 5 showing the position of the mechanical parts as the movable restraining bumper and passenger barrier are retracted toward the fixed bumper and wheelchair wheel.

With reference to FIG. 6B, piston actuating arm or movable member 16 is now partially retracted to a position in which linear actuating pivot arm 70 and movable bumper pivot arm 72 are rotated in a clockwise manner to cause movable bumper bracket 24 and passenger barrier 22 to also be rotated in a clockwise direction in front the space occupied by the wheelchair.

It is important to observe the angle formed by the longitudinal axis of movable bumper connector rod 64 and the longitudinal axis of movable bumper pivot arm 72, as well as the position of pivot pin 68 relative to a line drawn between shaft 48 and pivot pin 96. As shown in FIG. 6B, pivot pin 68, defining tne apex of the angle formed by the intersection of the longitudinal axes of movable bumper connector rod 64 and movable bumper pivot arm 72, is below the line drawn between the center of shaft 48 and the center of pivot pin 96 and on the same side of shaft 48 as piston actuating arm 60. Pivot pin 68 is purposely located in this position so that any counterclockwise pressure on passenger barrier 22 will tend to force movable bumper pivot arm 72 to continue to rotate in a clockwise direction. Also the same force being applied to passenger barrier 22 will tend to pull piston actuating arm 60 to the left out of cylinder 58. By providing movable bumper pivot arm 72 with a stop 71 which is attached to movable support 16, movable bumper pivot arm 72 will be prevented from any further movement in the clockwise direction. This will prevent any counterclockwise rotation of movable bumper bracket 24 and passenger barrier 22 about pivot 66. Thus, no matter what force is applied to passenger barrier 22, it will not open and will thus hold the wheelchair and its passenger in wheelchair restraining apparatus 10 in the event of a panic stop or collision of the transit vehicle.

Figure 6C:
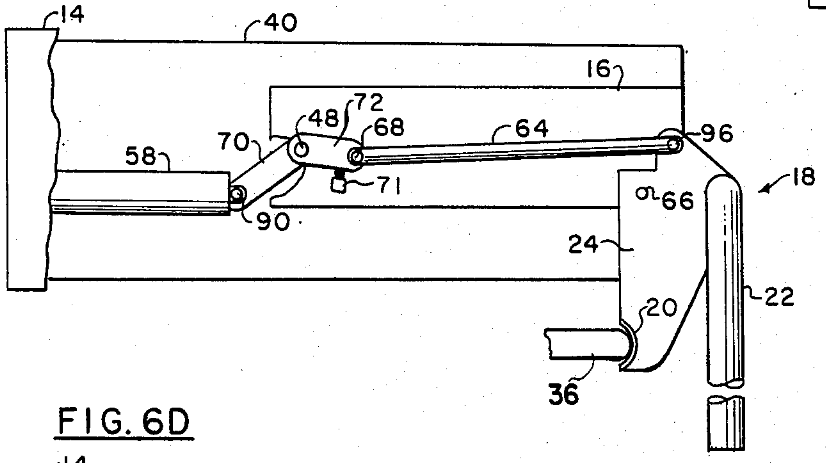
FIG. 6C is a schematic diagram of the linear actuating mechanism of the wheelchair restraining device of FIG. 5 showing the position of the mechanical parts of the apparatus when the movable restraining bumper and passenger barrier are at their closed position to the fixed barrier and wheelchair wheel.

With reference to FIG. 6C, piston actuating arm 60 has now retracted to its fully retracted position in which it has pulled bumper barrier movable support 16 to the left until movable bumper 20 engages wheel 36 of wheelchair 12.

Figure 6D:
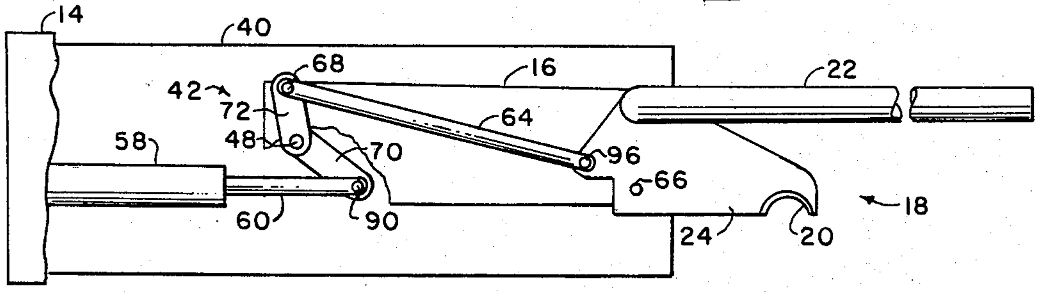
FIG. 6D is a schematic diagram of the linear actuating mechanism of the wheelchair restraining device of FIG. 5 showing the position of the mechanical parts just after the actuating mechanism begins its movement away from the fixed barrier end of the apparatus.

To release wheel 36 of wheelchair 12, reference is made to FIG. 6D. As piston actuating arm 60 is extended to the right, pivot arm 70 and 72 are caused to rotate in a counterclockwise direction with shaft 48, to pull movable bumper connector rod 64 to the left, thus pulling on pivot pin 96 to cause movable bumper bracket 24 and passenger barrier 22 to rotate in a counterclockwise direction about pivot 66.

Further extension of piston actuating arm 60 to the right will cause movable support 16 to be extended to the right to the position shown in FIG. 6A ready to receive another wheelchair and passenger.

To operate the apparatus shown in FIGS. 6A through 6D, inclusive, the position of the hydraulic system operating valves are initially set as shown in FIG. 8A.

Each operating valve has 2 positions. An "a", or upper, position and a "b", or lower, position.

In FIG. 8A, emergency system pressure dump valve 206 is positioned to conduct air pressure from air supply 202 and conduit 208 through ports 204*a* and 210*a* to conduit 214 and port 216*a* of transit vehicle driver control valve 218.

From inlet port 216*a*, air pressure is directed through transit vehicle driver control valve 218 to outlet port 222*a* and into conduit 224 to provide air pressure to hydraulic fluid reservoir 226.

The pressure to hydraulic fluid reservoir 226 causes the level of hydraulic fluid 250 to be lowered forcing hydraulic fluid 250 into conduit 260, through throttling valve 262 and into the lower portion (left end) of hydraulic/pneumatic cylinder 58 from conduit 264 thus forcing piston rod 60 to the right or extended position. This action causes linear actuator pivot arm 70 and movable bumper pivot arm 72 to be rotated in a counterclockwise direction with shaft 48 to create tension in movable bumper connector rod 64 and cause movable bumper bracket 24 and passenger barrier 22 to also rotate in a counterclockwise direction about pivot pin 66, as shown in FIG. 8A.

When a wheelchair passenger enters the transit vehicle, the transit vehicle driver actuates or moves transit vehicle driver control valve 218 to the position "b" shown in FIG. 8B. Fixed bumper actuating switch or valve 34 is not yet actuated but remains in the position as shown in FIG. 8A.

When transit vehicle drive control valve 218 is in position "b", air pressure is provided at inlet port 216*b* and is conducted on to outlet port 222*b*, into conduit 234 and up to blocked inlet port 230*a* of fixed bumper actuating switch or valve 34.

As soon as a wheelchair activates fixed bumper actuating switch or valve 34, as shown in FIG. 8B, conduit 234 is now connected to inlet port 238*b* whereby conduit 244 also becomes connected to outlet port 242*b* thus permitting pneumatic pressure to be applied to the upper or right side of hydraulic/pneumatic cylinder 58 through throttling valve 246 and conduit 248. This will, of course, cause piston actuating arm 60 to move to the left. This leftward movement causes piston actuating pivot arm 70 and movable bumper pivot arm 72 to rotate in a clockwise direction using shaft 48 and cause movable bumper connector rod 64 to push against pivot 96 to rotate movable bumper bracket 24 and passenger barrier 22 in a clockwise direction about pivot 66. It will thus tend to pull movable bumper bracket 24 toward the wheelchair to restrain the wheelchair and its passenger.

As piston rod 60 moves to the left, hydraulic fluid 250 on the left or lower side of cylinder 58 is caused to move through conduit 264, through throttling valve 262, through conduit 260 and then back into reservoir 226. The air in the upper portion of hydraulic fluid reservoir 226 is caused to pass into conduit 224, which is now connected to port 232*b* of valve 218, through valve 218 and out to the atmosphere through outlet port 230*b*.

When the transit vehicle arrives at the wheelchair passenger's destination, the transit vehicle driver can release the wheelchair by moving transit vehicle driver control valve 218 back to position "a" as shown in FIG. 8A. The wheelchair will still be in position against fixed bumper actuating switch or valve 34 now held in position "b". Air under pressure from cylinder 85 will now pass out into conduit 248, through tnrottling valve 246 into conduit 244, which is connected to port 242*b* of fixed bumper actuating switch or valve 34. From port 242*b*, air pressure will be released through fixed bumper actuating switch or valve 34, now in position "b", to port 238*b* and into conduit 234, which is now connected to port 232*a* of valve 218, which, now in position "a", is vented to atmosphere tnrough port 230*a* (FIG. 8A). Concurrently, air pressure, as previously described, coming from air supply 202 through conduits 208 and 214, enters valve 218 at port 216*a* and leaves valve 218 at port 222*a* to enter conduit 224 and provide air pressure to hydraulic fluid reservoir 226. The resulting air pressure in hydraulic fluid reservoir 226 then forces hydraulic fluid 250 into conduit 260, through throttling valve 262 and into cylinder 58 through conduit 264 to push piston actuating arm 64 to the right to the position shown in FIG. 8A.

By adjusting the orifice size in throttling valves 262 and 246, the speed at which the apparatus operates can be accurately controlled.

Furthermore, the combination of an hydraulic fluid with air has been found to provide a much smoother operation of the apparatus to counteract the elasticity of the compressed air which tends to cause a rough or jerking action because of the variation in friction of the parts during operation.

Figure 7A:
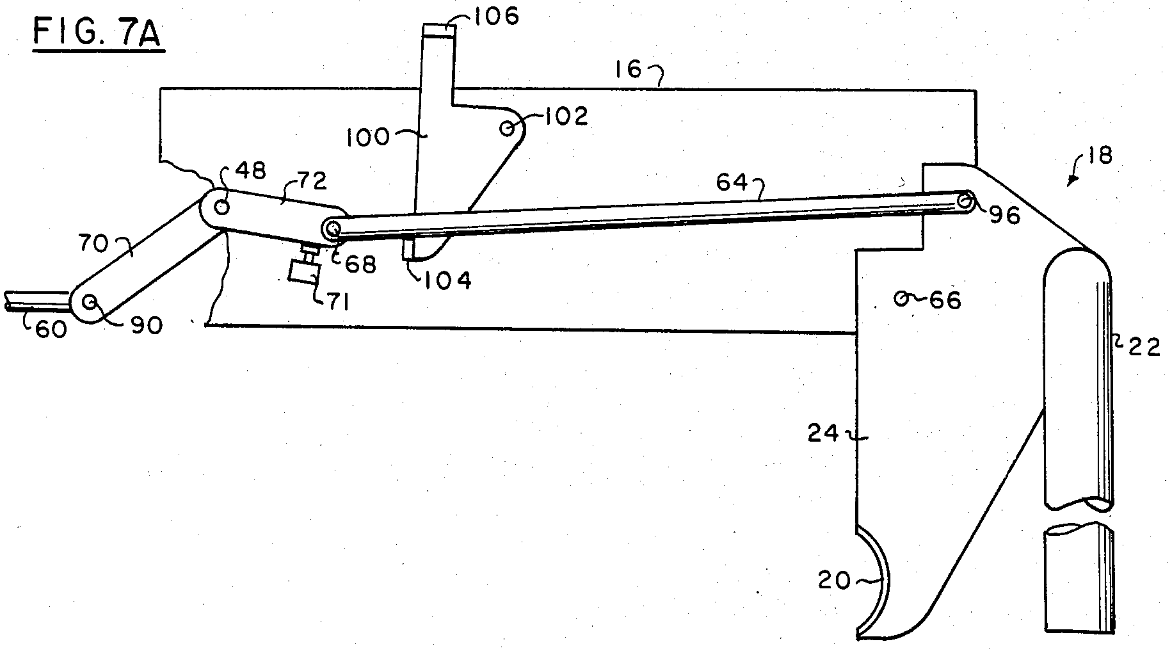
FIG. 7A is a schematic diagram of the apparatus of FIGS. 6A–6D showing the emergency release mechanism (prior to actuation) which opens the passenger barrier and releases the wheelchair in the event of a power failure.
Figure 7B:
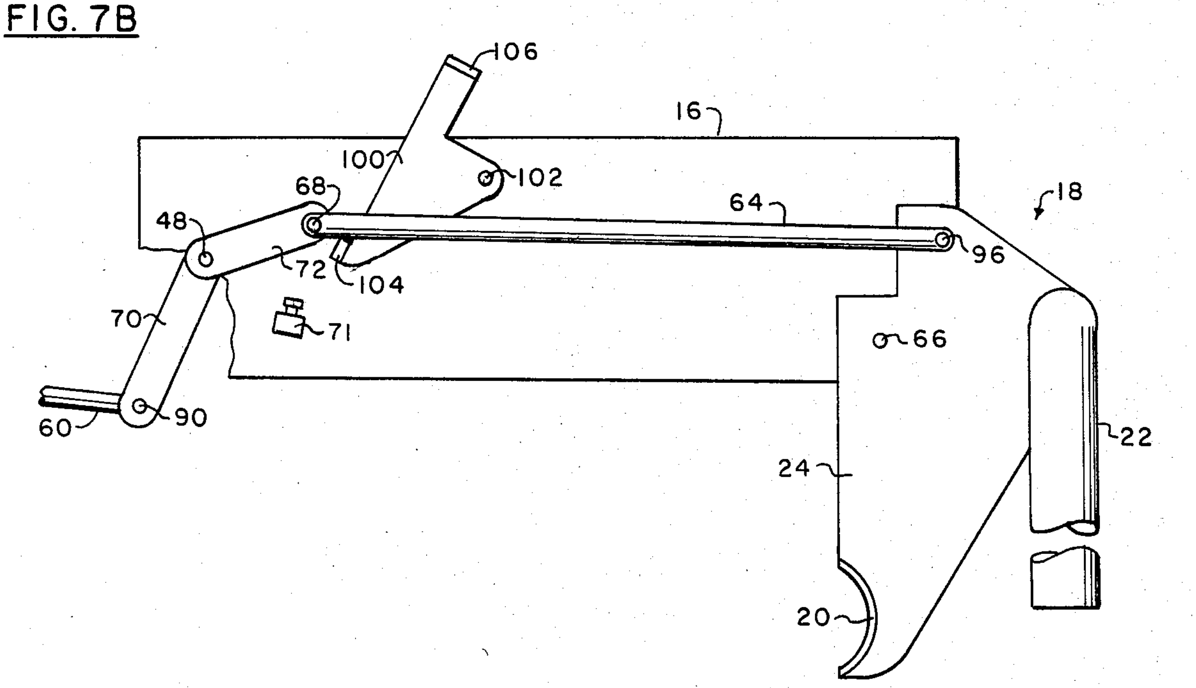
FIG. 7B is a schematic diagram of the apparatus of FIG. 7A showing the emergency release mechanism after actuation.

With reference to FIGS. 7A and 7B, there is illustrated a schematic diagram showing an emergency release mechanism which opens the passenger barrier and releases the movable restraining bumper 20 from wheel 36 of wheelchair 12 should there be a power failure or other event necessitating release of the restraining device by overriding the main operating mechanism previously described.

The emergency release mechanism shown in FIGS. 7A and 7B comprises, basically, an emergency release lever 100 pivotally connected to bumper barrier movable support 16 by pivot pin 102. One end of emergency release lever 100 comprises a bracket member 104 adapted to engage movable bumper connector rod 64, while the other end of emergency release lever 100 comprises a push handle 106 through which the passenger sitting in the wheelchair can push or rotate emergency release lever 100 in a counter-clockwise direction to the position as shown in FIG. 7B.

To operate the emergency release mechanism of FIGS. 7A and 7B, the passenger, as previously noted, can push against push handle 106 to rotate emergency release lever 100 in a clockwise direction, after first operating emergency system pressure dump valve 206 (located on top of housing 14 in FIGS. 1 and 2) by moving it from its "a" to its "dump" or "b" position as shown in FIGS. 8A and 8B. In so doing, bracket member 104 engages movable bumper connector rod 64 to force it in a direction away from the wheelchair operator. This action will move pivot pin 64 to a position in which the longitudinal axes of bumper bracket connector rod and movable bumper pivot arm 72 are now positioned whereby pivot pin 68 is located above an imaginary line drawn between the center of shaft 48 and the center of pivot pin 96 on the opposite side of shaft 48 as piston actuating arm 60. Now, any compressive forces against movable bumper connector rod 64 by a counterclockwise rotation of passenger barrier 22 will tend to rotate pivot arms 70 and 72, attached to shaft 48, in a counterclockwise direction to release wheel 36 of wheelchair 12 from wheelchair restraining apparatus 10.

I claim:

1. A wheelchair restraint apparatus comprising a fixed bumper adapted to engage one end of a wheelchair, a movable restraining bumper adapted to engage the other end of a wheelchair and hold said wheelchair in compression between said fixed restraining bumper and said movable retraining bumper, and means for moving said movable restraining bumper toward and away from said fixed bumper comprising a fixed actuator base support located adjacent one side of said wheelchair, a movable base support connected to said actuator base support and adapted to be moved in a horizontal linear motion generally parallel to said wheelchair, means connected to said movable base support for rotating said movable restraining bumper from a position away from the fixed restraining bumper to a position generally parallel to said fixed bumper, said movable restraining bumper being pivotally connected to said movable base support, means for moving said movable base support and parallel disposed movable restraining bumper toward said fixed restraining bumper in a straight line to engage said wheelchair and hold said wheelchair in compression between said movable restraining bumper and said fixed restraining bumper, said means comprising a linear motion actuator, a bumper pivot arm pivotally connected to said movable base support, a first linkage member connecting said bumper pivot arm to said movable restraining bumper, a second linkage member connecting said pivot arm to said linear motion actuator, and means for locking said means for moving said parallel disposed movable restraining bumper in a fixed position comprising a ratchet attached to said fixed actuator base support, a rocker arm pawl pivotally connected to said movable base support and adapted to engage said ratchet and hold said wheelchair in compression between said movable restraining bumper and said fixed restraining bumper.

2. The wheelchair restraining apparatus as claimed in claim 1 further comprising a movable barrier member adapted to move from a position away from said wheelchair into a position in front of said wheelchair in sequence with said movable restraining bumper as said movable restraining bumper moves to engage said wheelchair.

* * * * *